April 3, 1928.

R. O. HELGEBY

DASH LIGHT

Filed March 14, 1927

1,664,684

Inventor
Ralph O. Helgeby

By Blackmore, Spencer & Hull
Attorneys

Patented Apr. 3, 1928.

1,664,684

UNITED STATES PATENT OFFICE.

RALPH O. HELGEBY, OF FLINT, MICHIGAN, ASSIGNOR TO A C SPARK PLUG COMPANY, OF FLINT, MICHIGAN, A COMPANY OF MICHIGAN.

DASH LIGHT.

Application filed March 14, 1927. Serial No. 175,275.

This invention relates to automotive vehicles particularly to the lights used on dash boards to illuminate the instrument panel.

It is an object of the present invention to produce a dash light which will give very soft illumination and avoid glare. The novel dash light of the present disclosure is attached to the instrument panel and comprises a housing or casing enclosing the light bulb. The casing is preferably circular and at the bottom side of its end portion it is provided with a plurality of openings to allow the light to shine thru while a polished mushroom shaped head is attached to the center of the casing end so as to reflect the light rearwardly onto the instruments. Preferably although not necessarily a piece of blue pyralin is fixed to the inside of the casing and thru which the light is forced to shine before striking against the polished surface of the mushroom head. This arrangement gives a very soft light and eliminates the glare.

The invention is disclosed in the accompanying drawing in which.

Figure 1:
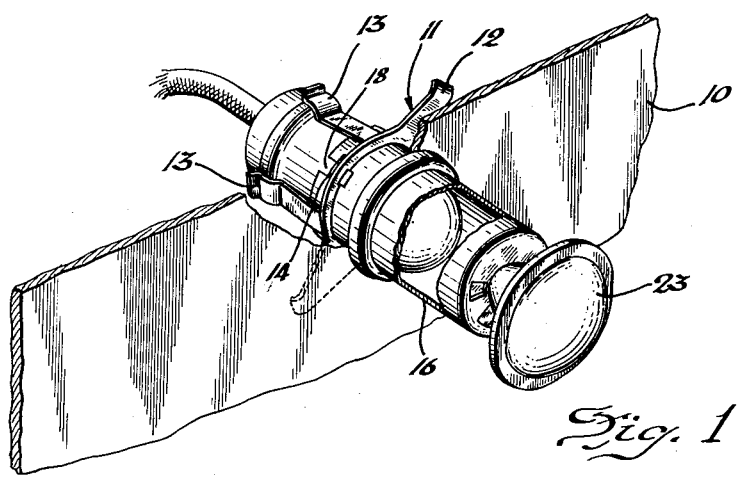
Figure 1 is a perspective view of an instrument board of an automotive vehicle with my invention applied thereto.
Figure 2:
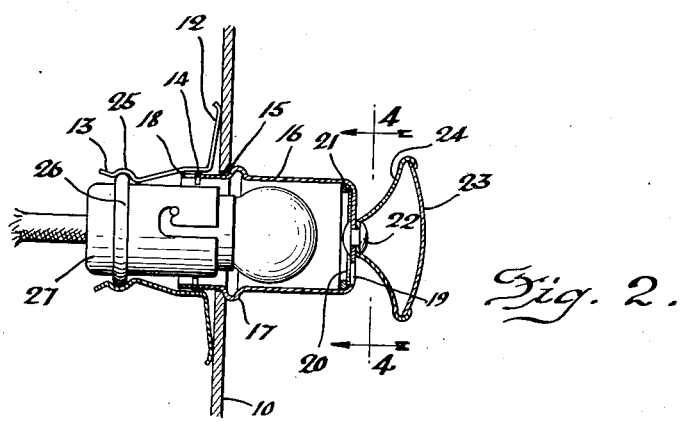
Figure 2 is a longitudinal view of the structure shown in Figure 1.
Figure 3:
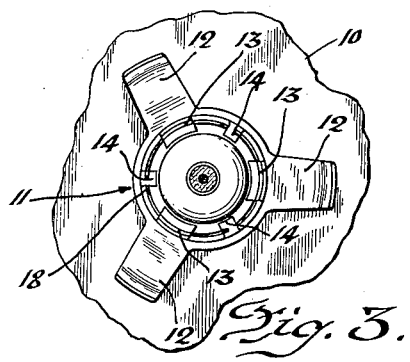
Figure 3 is an elevation, looking from the rear, of the stamping of my invention.
Figure 4:
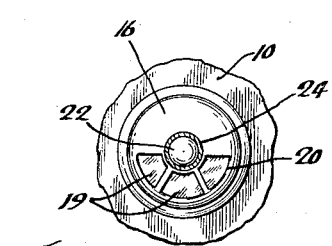
Figure 4 is a section on line 4—4 of Figure 2.

Referring to the numbered parts of the drawing 10 denotes an instrument board to which there is applied a stamping 11 having a plurality of spring prongs 12, preferably three in number, which abut the rear side of the instrument board. The stamping 11 is also provided with a plurality of spring fingers 13, preferably three in number, and a plurality of tongues 14 the purpose of which will be later described.

The instrument board 10 is provided with an opening 15 into which extends from its front side a casing or housing 16 having a bead 17 contacting with the instrument board and a plurality of slots 18 at its rear portion where it extends thru the instrument board. The slots 18 at the end of the housing 16 are of the bayonet type and coincide with the tongues 14 by means of which the housing is held to the instrument board.

The end of the housing is provided with a plurality of openings 19 at its lower side and over these openings on the inside of the casing there is placed a blue pyralin disc 20 secured within a housing by any suitable means such as a spring 21.

To the exposed end of the housing 16 at its central portion there is secured by means of a rivet 22 a mushroom shaped head 23 having its inner surface 24 curved and highly polished. This surface 24 acts as a reflector to deflect the light rays rearwardly and downwardly onto the instruments.

The fingers 13 are provided with depressions 25 which engage over a bead 26 on the lamp socket 27 to removably hold it in place.

The spring prongs 12 may or may not be secured to the inner side of the instrument board 10 and from the structure as described it is obvious that by turning the housing 16 so that the tongues 14 will leave the bayonet slots 18 the housing 16 may be removed.

I claim.

1. In a dash light, a casing for said light, a plurality of openings in the casing end, a pyralin sheet inside said casing over said openings, and a head on said casing to reflect the light rearwardly.

2. In a dash light, a casing for said light, a plurality of openings in the casing end, a transparent sheet inside said casing over said openings, said sheet softening the light, and a reflecting head on said casing to reflect the light rearwardly.

3. In a dash light, a casing for said light, a plurality of openings in the bottom half of the casing end, a solid upper portion to said casing end, a transparent medium over said openings, and a head on said casing to reflect the light rearwardly.

4. In combination with the instrument board of an automotive vehicle, a light, a stamping abutting the rear of said instrument board, a casing housing said light and fitting in an opening in said board from the front, and means on said stamping to hold said casing.

5. The combination of claim 4, said means comprising a plurality of slots in said casing and a plurality of tongues on said stamping.

6. The combination of claim 4, said stamping comprising a plurality of prongs abutting the rear side of said board, a plurality of fingers extending at right angles to said prongs for holding said light, and a plurality of tongues interlocking with said casing.

7. The combination of claim 4, and a bead on said casing abutting said instrument board.

8. The combination of claim 1, said head having a curved reflecting surface.

9. In combination with the instrument board of an automotive vehicle, a light, means at said instrument board for retaining said light, means inclosing said light and fitting in an opening in said instrument board, and means on said first named means to hold said second named means.

10. The combination of claim 9, said first and second named means being removably attached too each other.

11. The combination of claim 9, said first and second named means being removably secured to each other and confining the instrument board between them.

In testimony whereof I affix my signature.

RALPH O. HELGEBY.